United States Patent
Maehara et al.

(10) Patent No.: US 9,116,059 B2
(45) Date of Patent: Aug. 25, 2015

(54) TORQUE SENSOR

(75) Inventors: Hideo Maehara, Kani (JP); Takaya Yagyu, Toki (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 43 days.

(21) Appl. No.: 14/005,649

(22) PCT Filed: Mar. 8, 2012

(86) PCT No.: PCT/JP2012/056007
§ 371 (c)(1),
(2), (4) Date: Sep. 17, 2013

(87) PCT Pub. No.: WO2012/128060
PCT Pub. Date: Sep. 27, 2012

(65) Prior Publication Data
US 2014/0007701 A1    Jan. 9, 2014

(30) Foreign Application Priority Data

Mar. 18, 2011  (JP) .................................. 2011-060228
Sep. 6, 2011   (JP) .................................. 2011-193793

(51) Int. Cl.
*G01L 3/02*  (2006.01)
*G01L 3/10*  (2006.01)

(52) U.S. Cl.
CPC ................. *G01L 3/101* (2013.01); *G01L 3/104* (2013.01)

(58) Field of Classification Search
CPC ........ G01L 3/101; G01L 3/104; G01L 3/1435
USPC ..................................... 73/862.331–862.335
See application file for complete search history.

(56) References Cited

U.S. PATENT DOCUMENTS

| 6,291,914 | B1 * | 9/2001 | Mukaiyama ................ 310/68 B |
| 6,880,411 | B2 * | 4/2005 | Nakane et al. ........... 73/862.331 |
| 7,987,734 | B2 * | 8/2011 | Maehara ................... 73/862.333 |

(Continued)

FOREIGN PATENT DOCUMENTS

| EP | 2107354 A2 | 10/2009 |
| JP | 08-270614 A | 10/1996 |
| JP | 2005-121507 A | 5/2005 |
| JP | 2007-040789 A | 2/2007 |
| JP | 2009-244134 A | 10/2009 |

OTHER PUBLICATIONS

Extended European Search Report issued Sep. 4, 2014, corresponding to European patent application No. 12760559.0.

(Continued)

*Primary Examiner* — Max Noori
(74) *Attorney, Agent, or Firm* — Lowe Hauptman & Ham, LLP (57) ABSTRACT

In a torque sensor that detects torque acting on a torsion bar on the basis of a magnetic flux density conducted to a magnetism collecting ring provided in a housing, the magnetism collecting ring is an annular member formed such that an axial direction end portion thereof is thinner than a central portion. The housing includes an annular groove formed to be capable of accommodating the magnetism collecting ring and provided as a recess in an inner peripheral wall of the housing so as to be deeper than a thickness of the end portion of the magnetism collecting ring, and a caulk portion provided in the inner peripheral wall to caulk the magnetism collecting ring by covering the end portion of the magnetism collecting ring that is fitted into the annular groove.

4 Claims, 8 Drawing Sheets

(56) References Cited

U.S. PATENT DOCUMENTS

| | | | |
|---|---|---|---|
| 8,418,570 B2 * | 4/2013 | Maehara | 73/862.325 |
| 8,847,522 B2 * | 9/2014 | Nashiki et al. | 318/254.1 |
| 2009/0241693 A1 | 10/2009 | Maehara | |

OTHER PUBLICATIONS

International Search Report and Written Opinion corresponding to PCT/JP2012/056007, dated May 15, 2012.

* cited by examiner

TORQUE SENSOR

TECHNICAL FIELD

The present invention relates to a torque sensor that detects torque acting on a shaft in accordance with a magnetic flux density conducted from a magnet.

BACKGROUND ART

JP2009-244134A discloses a non-contact type torque sensor that detects steering torque acting on a steering shaft using magnetic force. The torque sensor includes an input shaft and an output shaft supported in a housing to be free to rotate, a torsion bar that transmits the steering torque between the input shaft and the output shaft, a magnetism generating portion fixed to the input shaft, a rotary magnetic circuit portion fixed to the output shaft, a fixed magnetic circuit portion fixed to the housing, and a magnetism sensor that detects a magnetic flux density conducted to the fixed magnetic circuit portion.

When the steering torque acts on the torsion bar such that the torsion bar undergoes torsional deformation, relative rotation direction positions of the magnetism generating portion and the rotary magnetic circuit portion vary. Accordingly, the magnetic flux density conducted to the fixed magnetic circuit portion from the magnetism generating portion via the rotary magnetic circuit portion varies. The magnetism sensor outputs a signal corresponding to the magnetic flux density. The torque acting on the torsion bar is detected on the basis of the signal output from the magnetism sensor.

SUMMARY OF INVENTION

In the conventional torque sensor described above, the rotary magnetic circuit portion includes a pair of soft magnetic rings, and the fixed magnetic circuit portion includes a pair of magnetism collecting rings surrounding the respective soft magnetic rings. The magnetism collecting rings are fitted into annular grooves formed in the housing. The magnetism collecting rings are caulked to the housing by deforming an inner peripheral wall of the housing such that edge portions of the respective annular grooves contact axial direction end surfaces of the magnetism collecting rings. However, with a configuration in which caulked portions formed in the inner peripheral wall of the housing contact the end surfaces of the magnetism collecting rings, the magnetism collecting rings may disengage from the annular grooves depending on a caulking condition, and therefore the magnetism collecting rings must be attached to the housing more securely.

It is therefore an object of this invention to provide a torque sensor in which a magnetism collecting ring can be caulked to a housing more securely.

According to an aspect of the present invention, a torque sensor is configured to detect torque acting on a torsion bar coupling a first shaft and a second shaft that are supported in a housing to be free to rotate. The torque sensor includes a magnetism generating portion fixed to the first shaft, a rotary magnetic circuit portion fixed to the second shaft, a magnetism collecting ring attached to the housing so as to face the rotary magnetic circuit portion, and a magnetism detector that is configured to detect a magnetic flux density that is conducted from the magnetism generating portion to the magnetism collecting ring via the rotary magnetic circuit portion when the torsion bar undergoes torsional deformation. The magnetism collecting ring is an annular member formed such that an axial direction end portion thereof is thinner than a central portion. The housing includes an annular groove formed to be capable of accommodating the magnetism collecting ring and provided as a recess in an inner peripheral wall of the housing so as to be deeper than a thickness of the end portion of the magnetism collecting ring, and a caulk portion provided in the inner peripheral wall to caulk the magnetism collecting ring by covering the end portion of the magnetism collecting ring that is fitted into the annular groove.

The details as well as other features and advantages of this invention are set forth in the remainder of the specification and are shown in the accompanying drawings.

DESCRIPTION OF EMBODIMENTS

A power steering apparatus 1 for a vehicle according to a first embodiment of the present invention will be described below with reference to the figures.

Figure 1:
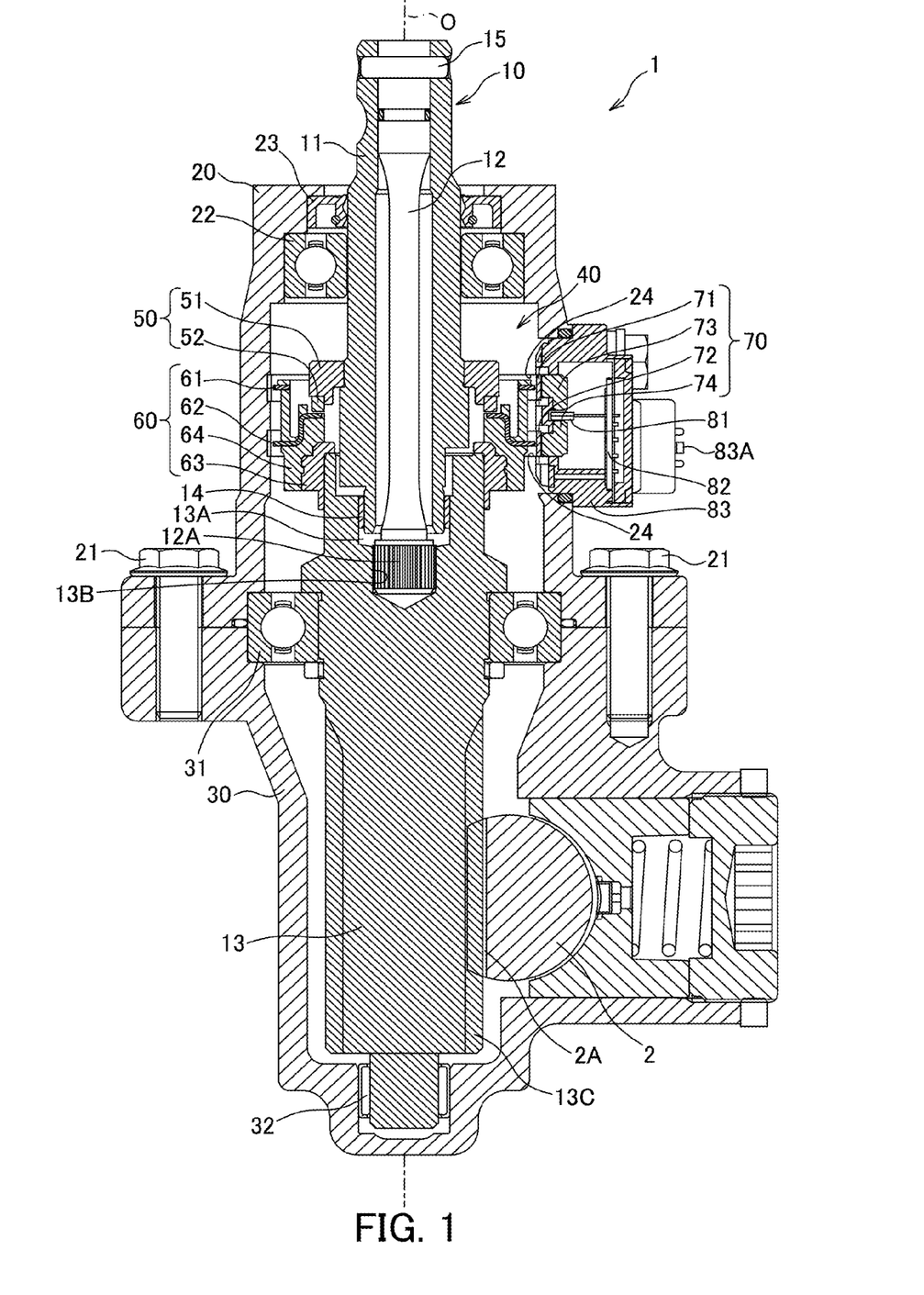
FIG. 1 is a longitudinal sectional view of a power steering apparatus according to a first embodiment of the present invention.
Figure 2:
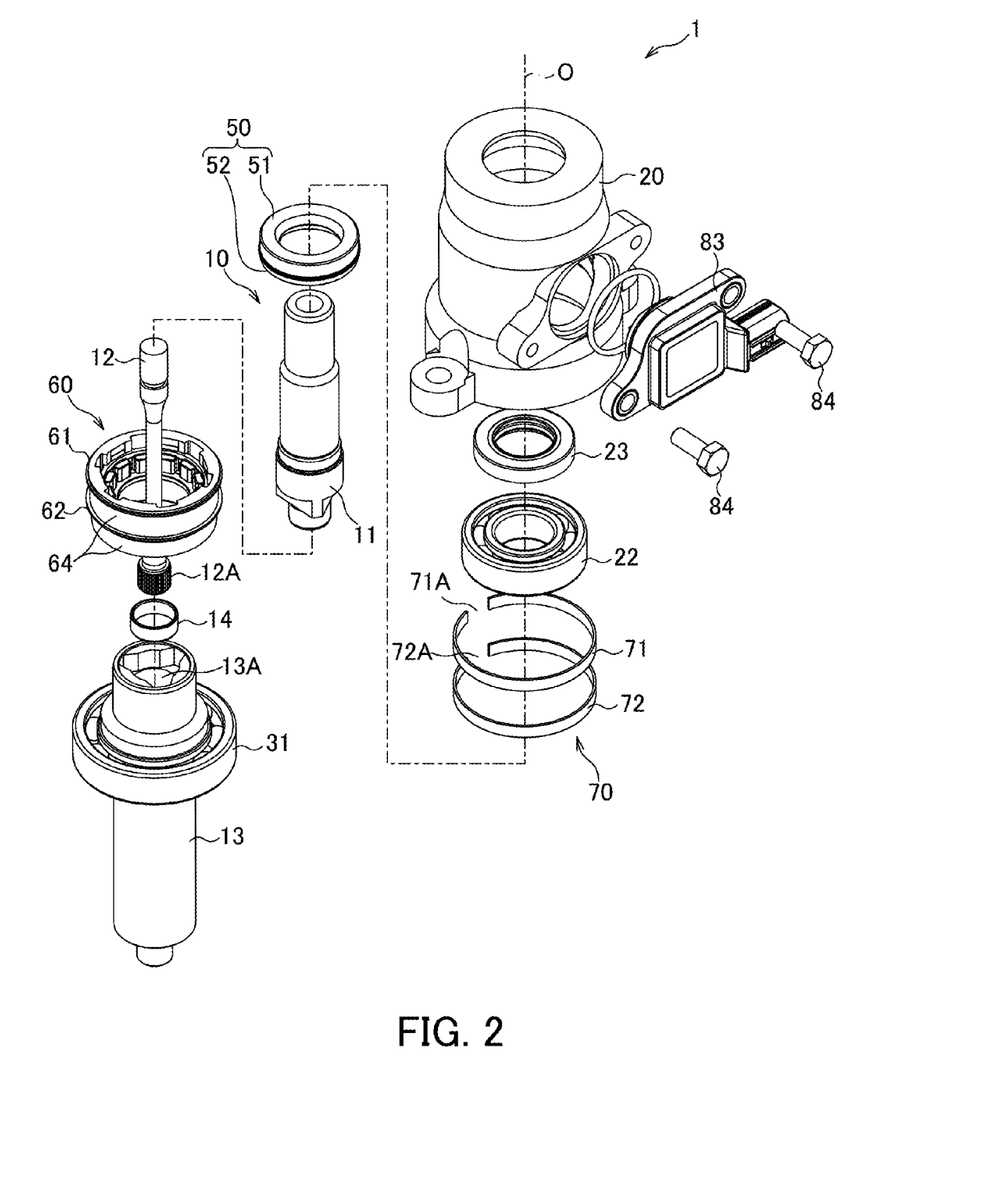
FIG. 2 is an exploded perspective view of the power steering apparatus in a condition where a lower housing has been removed.

As shown in FIGS. 1 and 2, the power steering apparatus 1 includes a steering shaft 10 linked to a steering wheel, and a rack shaft 2 linked to a vehicle wheel. The power steering apparatus 1 steers the vehicle wheel by rotating the steering shaft 10 so that the rack shaft 2 moves in an axial direction.

The steering shaft 10 is a shaft member which is supported by an upper housing 20 and a lower housing 30 coupled by a bolt 21. The upper housing 20 and the lower housing 30 are formed from an alloy of a non-magnetic material such as aluminum alloy. The steering shaft 10 includes an input shaft 11 serving as a first shaft, a torsion bar 12, and an output shaft 13 serving as a second shaft.

The input shaft 11 is supported by the upper housing 20 via a roller bearing 22 to be free to rotate. The input shaft 11 and the upper housing 20 are sealed from each other by a dust seal 23. The dust seal 23 is disposed above the roller bearing 22.

The output shaft 13 is supported to be free to rotate by a roller bearing 31 sandwiched between a lower end portion of the upper housing 20 and an upper end portion of the lower housing 30, and a slide bearing 32 disposed in a lower end portion of the lower housing 30.

An accommodation chamber 13A capable of accommodating a lower end portion of the input shaft 11 is formed in an upper end portion of the output shaft 13. A slide bearing 14 is interposed between an inner peripheral surface of the accommodation chamber 13A of the output shaft 13 and an outer peripheral surface of the lower end portion of the input shaft 11. As a result, the input shaft 11 and the output shaft 13 are capable of rotating relatively and coaxially.

The input shaft 11 is formed in a cylindrical shape, and the torsion bar 12 is housed in an interior of the input shaft 11 coaxially therewith. An upper end portion of the torsion bar 12 is coupled to an upper end portion of the input shaft 11 via a pin 15.

A lower end portion of the torsion bar 12 projects downward from a lower end opening portion of the input shaft 11. A serration 12A is formed on an outer peripheral surface of the lower end portion of the torsion bar 12. The lower end portion of the torsion bar 12 is coupled via the serration 12A to an engagement hole 13B formed in a bottom portion of the accommodation chamber 13A.

The torsion bar 12 transmits steering torque input into the input shaft 11 to the output shaft 13, and undergoes torsional deformation around a rotary axis O in accordance with the torque.

A gear 13C is provided on an outer peripheral surface of the output shaft 13 toward the lower end thereof. The gear 13C of the output shaft 13 meshes with a rack gear 2A formed on the rack shaft 2. When the output shaft 13 rotates in response to rotation of the input shaft 11, the rack shaft 2 moves in the axial direction, and as a result, the vehicle wheel is steered.

The power steering apparatus 1 includes, as an assist mechanism for applying auxiliary steering torque, a non-contact type torque sensor 40 that detects the steering torque acting on the torsion bar 12, and an electric motor that applies auxiliary steering torque to the rack shaft 2 in accordance with the detected steering torque.

The torque sensor 40 includes a magnetism generating portion 50 that rotates together with the input shaft 11, a rotary magnetic circuit portion 60 that rotates together with the output shaft 13, a fixed magnetic circuit portion 70 fixed to the upper housing 20, and a magnetism sensor 81 that detects a magnetic flux density conducted to the fixed magnetic circuit portion 70. The torque sensor 40 detects the steering torque acting on the torsion bar 12 on the basis of an output of the magnetism sensor 81.

The torque sensor 40 may be configured such that the magnetism generating portion 50 is provided on the output shaft 13 and the rotary magnetic circuit portion 60 is provided on the input shaft 11.

Figure 3A:
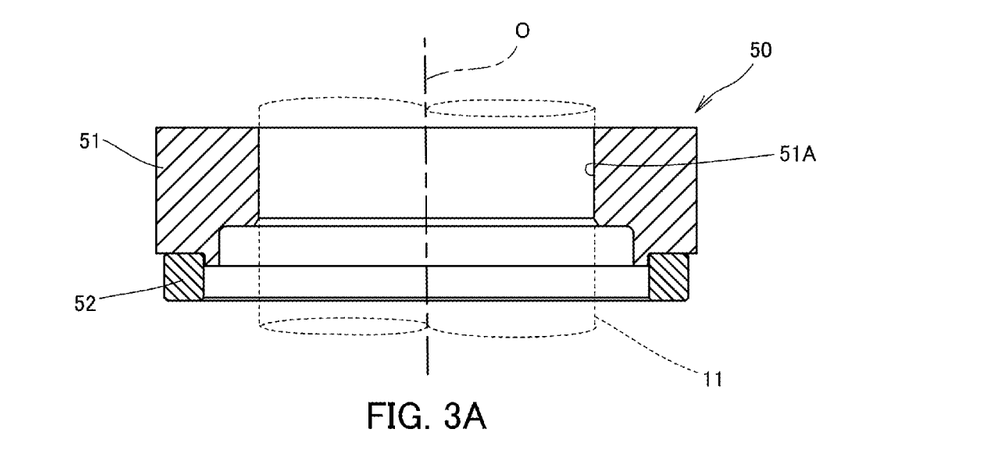
FIG. 3A is a longitudinal sectional view of a magnetism generating portion included in a torque sensor provided in the power steering apparatus.
Figure 3B:
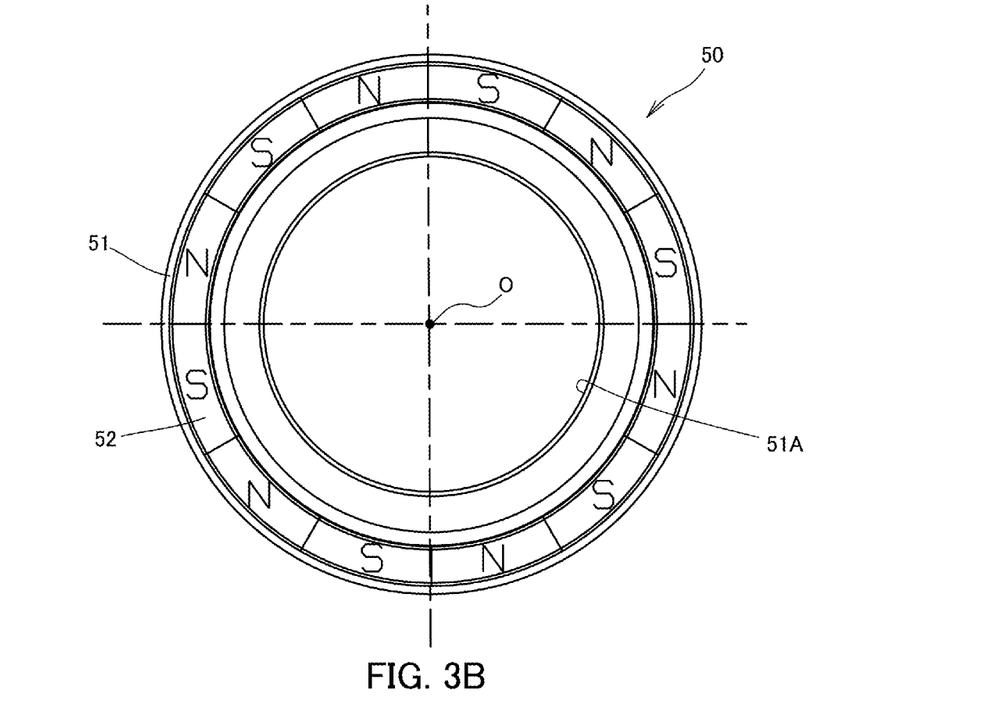
FIG. 3B is a lower view of the magnetism generating portion included in the torque sensor.

As shown in FIGS. 1, 3A, and 3B, the magnetism generating portion 50 includes a back yoke 51 that is press-fitted to the input shaft 11, and a ring magnet 52 fixed to a lower end surface of the back yoke 51 via an adhesive.

The back yoke 51 is an annular member formed from an alloy of a soft magnetic material. A fitting hole 51A is formed in the back yoke 51 to penetrate in a rotary axis O direction. The back yoke 51 is press-fitted to the outer peripheral surface of the input shaft 11 via the fitting hole 51A.

The ring magnet 52 is an annular member formed from sintered metal. The ring magnet 52 is a multipolar magnet formed by polarizing a hard magnetic material in the rotary axis O direction of the steering shaft 10.

Twelve magnetic poles are formed on the ring magnet 52 at equal intervals in a circumferential direction. In other words, six N poles and six S poles are disposed alternately in the circumferential direction on an upper end surface and a lower end surface of the ring magnet 52. The number of magnetic poles provided on the ring magnet 52 is not limited to twelve, and may be set as desired according to necessity.

The ring magnet 52 is fixed to the lower end surface of the back yoke 51 by an adhesive applied to the upper end surface of the ring magnet 52. The back yoke 51 is magnetized by a magnetic field of the ring magnet 52, and therefore the back yoke 51 and the ring magnet 52 are joined not only by an adhesive force of the adhesive, but also by magnetic force. The back yoke 51 functions as a yoke that conducts magnetic flux by linking adjacent magnetic poles of the ring magnet 52, with the result that magnetic force is concentrated on a lower magnetic pole surface, i.e. the lower end surface, of the ring magnet 52.

Figure 4:
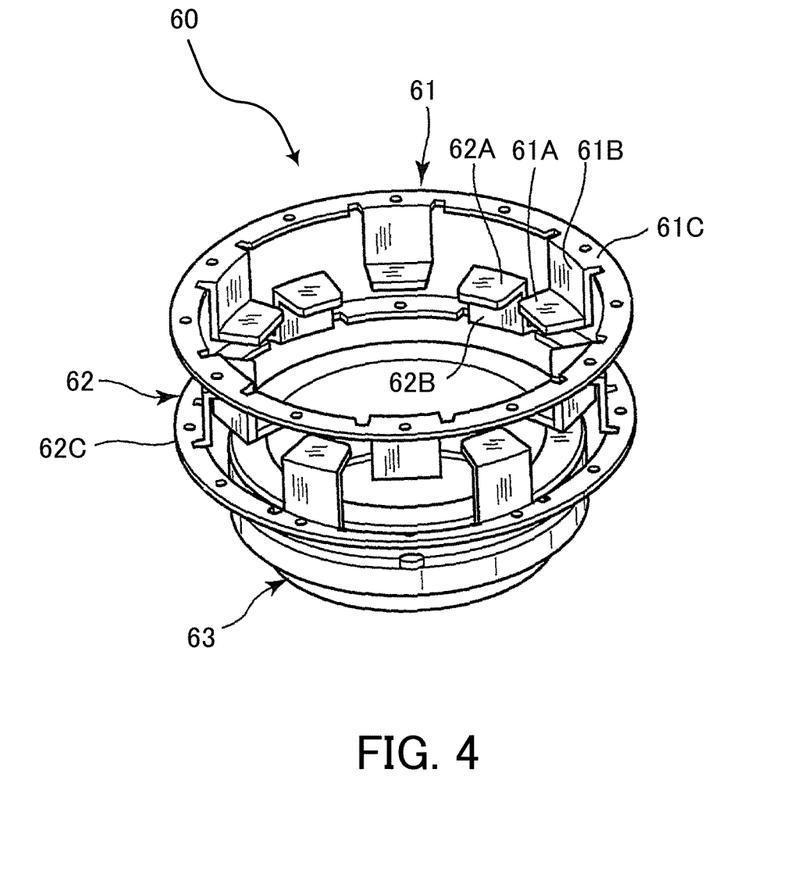
FIG. 4 is a perspective view of a rotary magnetic circuit portion included in the torque sensor.

As shown in FIGS. 1, 2, and 4, the rotary magnetic circuit portion 60 includes a first soft magnetic ring 61 and a second soft magnetic ring 62 that conduct the magnetic flux output from the ring magnet 52, an attachment member 63 attached to the output shaft 13, and a resin mold 64 that fixes the first soft magnetic ring 61 and the second soft magnetic ring 62 to the attachment member 63. It should be noted that illustration of the resin mold 64 has been omitted from FIG. 4.

The first soft magnetic ring 61 includes an annular first magnetic path ring portion 61C, six first magnetic path column portions 61B projecting downward from the first magnetic path ring portion 61C, and first magnetic path end portions 61A that are bent inward from respective lower ends of the first magnetic path column portions 61B so as to face the lower end surface of the ring magnet 52. Further, the second soft magnetic ring 62 includes an annular second magnetic path ring portion 62C, six second magnetic path column portions 62B projecting upward from the second magnetic path ring portion 62C, and second magnetic path end portions 62A that are bent inward from respective upper ends of the second magnetic path column portions 62B so as to face the lower end surface of the ring magnet 52.

The first magnetic path ring portion 61C and the second magnetic path ring portion 62C are annular members respectively having entirely connected circumferences. The first magnetic path ring portion 61C and the second magnetic path ring portion 62C are disposed via an interval in the rotary axis O direction such that the first magnetic path end portions 61A and the second magnetic path end portions 62A are arranged alternately at equal angular intervals on an identical plane.

The first magnetic path ring portion 61C is disposed above the ring magnet 52, whereas the second magnetic path ring portion 62C is disposed below the ring magnet 52. The ring magnet 52 is therefore disposed between the first magnetic path ring portion 61C and the second magnetic path ring portion 62C in the rotary axis O direction.

The first magnetic path column portions 61B and the second magnetic path column portions 62B are respectively formed in a flat plate shape and provided to extend in the rotary axis O direction. The first magnetic path column portions 61B are disposed to surround the outer peripheral surface of the ring magnet 52 via a predetermined gap. The second magnetic path column portions 62B extend in an opposite direction to the first magnetic path column portions 61B along the rotary axis O.

The first magnetic path end portions 61A and the second magnetic path end portions 62A are respectively formed in a flat plate shape. In a neutral condition where no steering torque acts on the torsion bar 12, respective center lines of the first magnetic path end portions 61A and the second magnetic path end portions 62A are set to indicate boundaries between the N poles and the S poles of the ring magnet 52.

As shown in FIGS. 1 and 2, the fixed magnetic circuit portion 70 includes a first magnetism collecting ring 71 provided around an outer periphery of the first magnetic path ring portion 61C of the first soft magnetic ring 61, a second magnetism collecting ring 72 provided around an outer periphery of the second magnetic path ring portion 62C of the second soft magnetic ring 62, a first magnetism collecting yoke 73 connected to the first magnetism collecting ring 71, and a second magnetism collecting yoke 74 connected to the second magnetism collecting ring 72.

The first magnetism collecting ring 71 is a substantially C-shaped annular member having a slit 71A, and the second magnetism collecting ring 72 is a substantially C-shaped annular member having a slit 72A. An upper-lower pair of annular grooves 24 are formed as recesses in an inner peripheral wall of the upper housing 20. The first magnetism collecting ring 71 is caulked to the upper housing 20 while fitted into the upper side annular groove 24, and the second magnetism collecting ring 72 is caulked to the upper housing 20 while fitted into the lower side annular groove 24.

The first magnetism collecting ring 71 and the second magnetism collecting ring 72 are disposed to surround the rotary magnetic circuit portion 60. An inner peripheral surface of the first magnetism collecting ring 71 faces the first magnetic path ring portion 61C of the first soft magnetic ring 61, and an inner peripheral surface of the second magnetism collecting ring 72 faces the second magnetic path ring portion 62C of the second soft magnetic ring 62.

The first magnetism collecting yoke 73 and the second magnetism collecting yoke 74 are block-shaped members. The first magnetism collecting yoke 73 is provided to contact the outer peripheral surface of the first magnetism collecting ring 71, and the second magnetism collecting yoke 74 is provided to contact the outer peripheral surface of the second magnetism collecting ring 72. A pair of magnetic gaps arranged side by side in the circumferential direction are formed between the first magnetism collecting yoke 73 and the second magnetism collecting yoke 74. One magnetism sensor 81 is disposed in each magnetic gap.

The first magnetism collecting yoke 73, the second magnetism collecting yoke 74, the magnetism sensor 81, and a substrate 82 connected to the magnetism sensor 81 are disposed in a sensor holder 83. The resin sensor holder 83 is fixed to the metal upper housing 20 via a pair of bolts 84.

The magnetism sensor 81 is a magnetism detector that detects a magnetic flux density conducted from the magnetism generating portion 50 to the first magnetism collecting ring 71 and second magnetism collecting ring 72 via the rotary magnetic circuit portion 60 in response to the torsional deformation of the torsion bar 12. The magnetism sensor 81 outputs a voltage as a signal corresponding to the magnetic flux density passing through a Hall element. The output signal of the magnetism sensor 81 is transmitted to a controller via a terminal 83A provided in the sensor holder 83. The magnetism sensor 81 may also be provided with a circuit that amplifies the signal from the Hall element, a circuit that performs temperature compensation, a noise filtering circuit, and so on.

Next, a function of the torque sensor 40 for detecting the steering torque acting on the torsion bar 12 will be described.

In the neutral condition where no steering torque acts on the torsion bar 12, the first magnetic path end portions 61A of the first soft magnetic ring 61 and the second magnetic path end portions 62A of the second soft magnetic ring 62 respectively face the N poles and S poles of the ring magnet 52 by identical surface areas, and therefore the respective poles are magnetically short-circuited. Magnetic flux is not therefore conducted to the rotary magnetic circuit portion 60 and the fixed magnetic circuit portion 70.

When the steering wheel is operated such that steering torque acts on the torsion bar 12 in a specific direction, the torsion bar 12 undergoes torsional deformation in accordance with the direction of the steering torque. When the torsion bar 12 undergoes torsional deformation, the first magnetic path end portions 61A face the N poles by a larger surface area than the S poles, and the second magnetic path end portions 62A face the S poles by a larger surface area than the N poles. Magnetic flux from the ring magnet 52 is conducted to the rotary magnetic circuit portion 60 and the fixed magnetic circuit portion 70, whereupon the magnetism sensor 81 outputs a signal corresponding to a intensity and a direction of the magnetic field.

In this case, a magnetic path extends from the N pole to the S pole via the first soft magnetic ring 61, the first magnetism collecting ring 71, the first magnetism collecting yoke 73, the magnetism sensor 81, the second magnetism collecting yoke 74, the second magnetism collecting ring 72, and the second soft magnetic ring 62.

On the other hand, when the steering wheel is operated such that steering torque acts on the torsion bar 12 in an opposite direction to the above direction, the torsion bar 12 undergoes torsional deformation in the opposite direction. When the torsion bar 12 undergoes torsional deformation, the first magnetic path end portions 61A face the S poles by a larger surface area than the N poles, and the second magnetic path end portions 62A face the N poles by a larger surface area than the S poles. Magnetic flux from the ring magnet 52 is conducted along an opposite magnetic path to the magnetic path described above, whereupon the magnetism sensor 81 outputs a signal corresponding to the intensity and the direction of the magnetic field.

In this case, the magnetic path extends from the N pole to the S pole via the second soft magnetic ring 62, the second magnetism collecting ring 72, the second magnetism collecting yoke 74, the magnetism sensor 81, the first magnetism collecting yoke 73, the first magnetism collecting ring 71, and the first soft magnetic ring 61.

As a surface area difference by which the first magnetic path end portions 61A face the N poles and the S poles of the ring magnet 52 and a surface area difference by which the second magnetic path end portions 62A face the N poles and the S poles of the ring magnet 52 increase, the magnetic fields in the magnetic gaps become steadily more intense. When the magnetic fields in the magnetic gaps increase in intensity, the output signal of the magnetism sensor 81 also increases.

The steering torque acting on the torsion bar 12 is detected on the basis of the signal output from the magnetism sensor 81.

Next, referring to FIGS. 5A to 6B, caulking of the first magnetism collecting ring 71 to the upper housing 20 of the power steering apparatus 1 will be described.

Figure 5A:
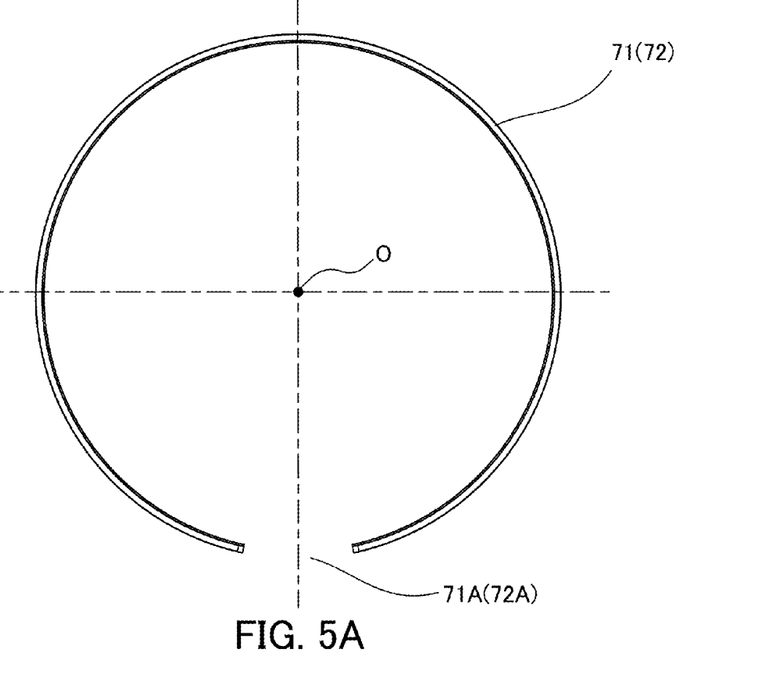
FIG. 5A is a plan view showing a first magnetism collecting ring of a fixed magnetic circuit portion included in the torque sensor.
Figure 5B:
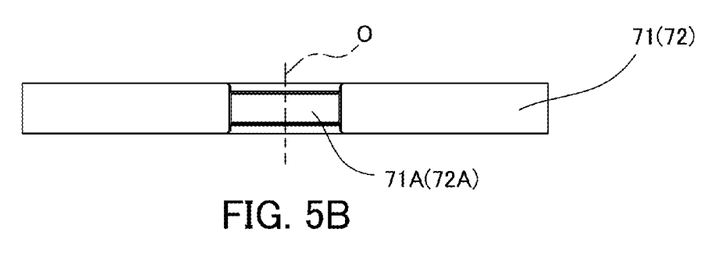
FIG. 5B is a front view of the first magnetism collecting ring.
Figure 5C:
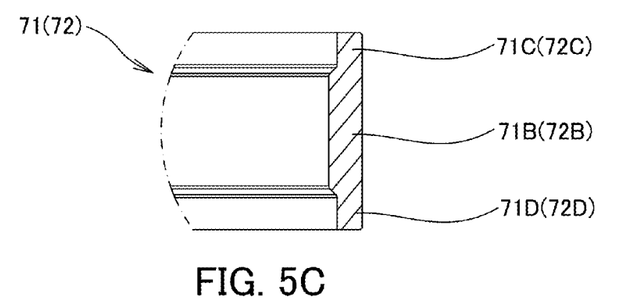
FIG. 5C is a partial longitudinal sectional view of the first magnetism collecting ring.

As shown in FIGS. 5A to 5C, the first magnetism collecting ring 71 is an annular member formed from a soft magnetic material. The slit 71A is formed in the first magnetism collecting ring 71 so as to open a predetermined gap in the circumferential direction.

The first magnetism collecting ring 71 is formed such that a central portion 71B thereof in the rotary axis O direction projects inward. A plate thickness in a radial direction of an upper end portion 71C and a lower end portion 71D of the first magnetism collecting ring 71 is set to be thinner than a plate thickness of the central portion 71B. Hence, the first magnetism collecting ring 71 is an annular member formed such that the upper end portion 71C and the lower end portion 71D are thinner than the central portion 71B. Accordingly, an inner peripheral surface of the first magnetism collecting ring 71 is formed as an irregular surface, a central part of which projects inward, while an outer peripheral surface of the first magnetism collecting ring 71 is formed as a flat surface.

Figure 6A:
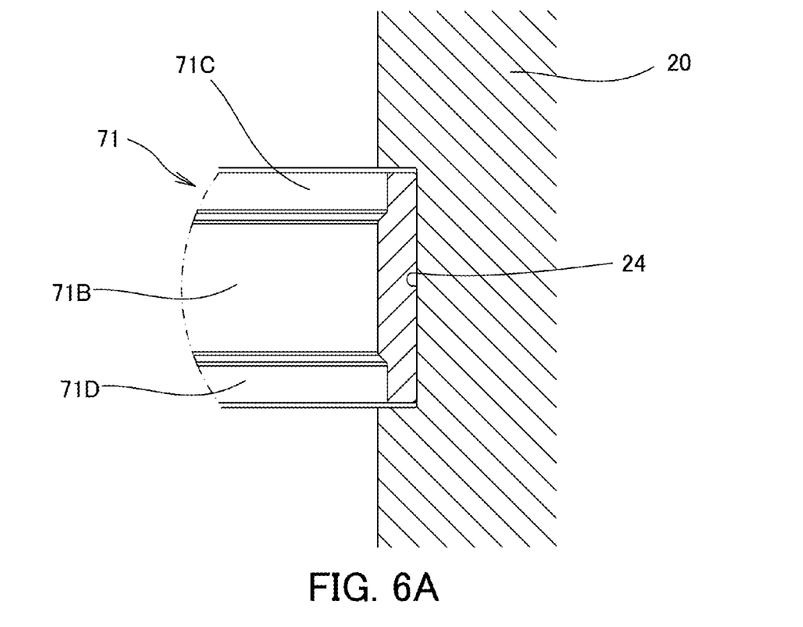
FIG. 6A is a partial longitudinal sectional view showing an upper housing prior to caulking of the first magnetism collecting ring.

As shown in FIG. 6A, the first magnetism collecting ring 71 is fitted into the annular groove 24 provided as a recess extending along the inner peripheral wall of the upper housing 20. When the first magnetism collecting ring 71 is fitted into the annular groove 24, an opening width of the slit 71A in the first magnetism collecting ring 71 narrows, thereby reducing an effect of the magnetic gap generated by the slit 71A.

A groove depth of the annular groove 24 in the upper housing 20 is set to be greater than the plate thickness of the upper end portion 71C and lower end portion 71D of the first magnetism collecting ring 71. Therefore, when the first magnetism collecting ring 71 is fitted into the annular groove 24, respective inner peripheral surfaces of the upper end portion 71C and the lower end portion 71D of the first magnetism collecting ring 71 are set back from the inner peripheral wall of the upper housing 20 toward the annular groove 24 side, while an inner peripheral surface of the central portion 71B of the first magnetism collecting ring 71 is flush with the inner peripheral wall of the upper housing 20. The inner peripheral surface of the central portion 71B faces an outer peripheral surface of the first magnetic path ring portion 61C of the first soft magnetic ring 61 via a predetermined gap.

Figure 6B:
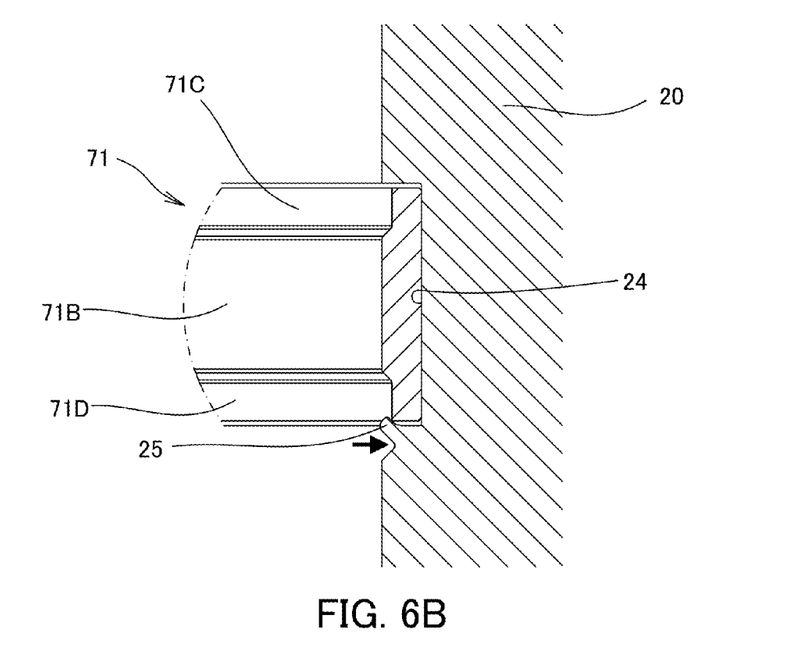
FIG. 6B is a partial longitudinal sectional view showing the upper housing following caulking of the first magnetism collecting ring.

As shown in FIG. 6B, the first magnetism collecting ring 71 fitted into the annular groove 24 is caulked to the upper housing 20 by caulk portions 25 formed on the inner peripheral wall of the upper housing 20.

Six caulk portions 25 are formed in the circumferential direction on the inner peripheral wall of the upper housing 20 on a lower side of the annular groove 24. In this embodiment, six caulk portions 25 are formed, but the number of caulk portions 25 may be set as desired according to necessity. The caulk portions 25 are formed to cover the lower end portion 71D of the first magnetism collecting ring 71 by driving a caulking tool into the inner peripheral wall of the upper housing 20 in a position of an arrow in FIG. 6B so as to deform a part of the inner peripheral wall of the upper housing 20.

Since the first magnetism collecting ring 71 is caulked to the upper housing 20 by the six caulk portions 25 in this manner, the first magnetism collecting ring 71 does not rattle or rotate within the annular groove 24. The caulk portions 25 latch a lower side of the inner peripheral surface of the first magnetism collecting ring 71, thereby restricting movement of the first magnetism collecting ring 71 in the radial direction, and as a result, the first magnetism collecting ring 71 can be prevented from disengaging from the annular groove 24.

The caulk portions 25 are formed to cover the thin lower end portion 71D of the first magnetism collecting ring 71, and do not therefore project further inward than the inner peripheral wall of the upper housing 20. Furthermore, in a caulked condition, the inner peripheral surface of the central portion 71B of the first magnetism collecting ring 71 is flush with the inner peripheral wall of the upper housing 20. In other words, the inner peripheral surface of the central portion 71B and the inner peripheral wall of the upper housing 20 are positioned on an identical cylindrical surface. Hence, when the output shaft 13, to which the rotary magnetic circuit portion 60 is fixed, is inserted into the upper housing 20 during assembly of the torque sensor 40, a collision between constituent members of the rotary magnetic circuit portion 60 and the first magnetism collecting ring 71 and caulk portions 25 is prevented.

The inner peripheral surface of the central portion 71B of the first magnetism collecting ring 71 may be set to be substantially flush with the inner peripheral wall of the upper housing 20. In other words, the inner peripheral surface of the central portion 71B may be set to be slightly higher or slightly lower than the inner peripheral wall of the upper housing 20 as long as a collision between the constituent members of the rotary magnetic circuit portion 60 and the first magnetism collecting ring 71 and caulk portions 25 is prevented.

Figure 7:
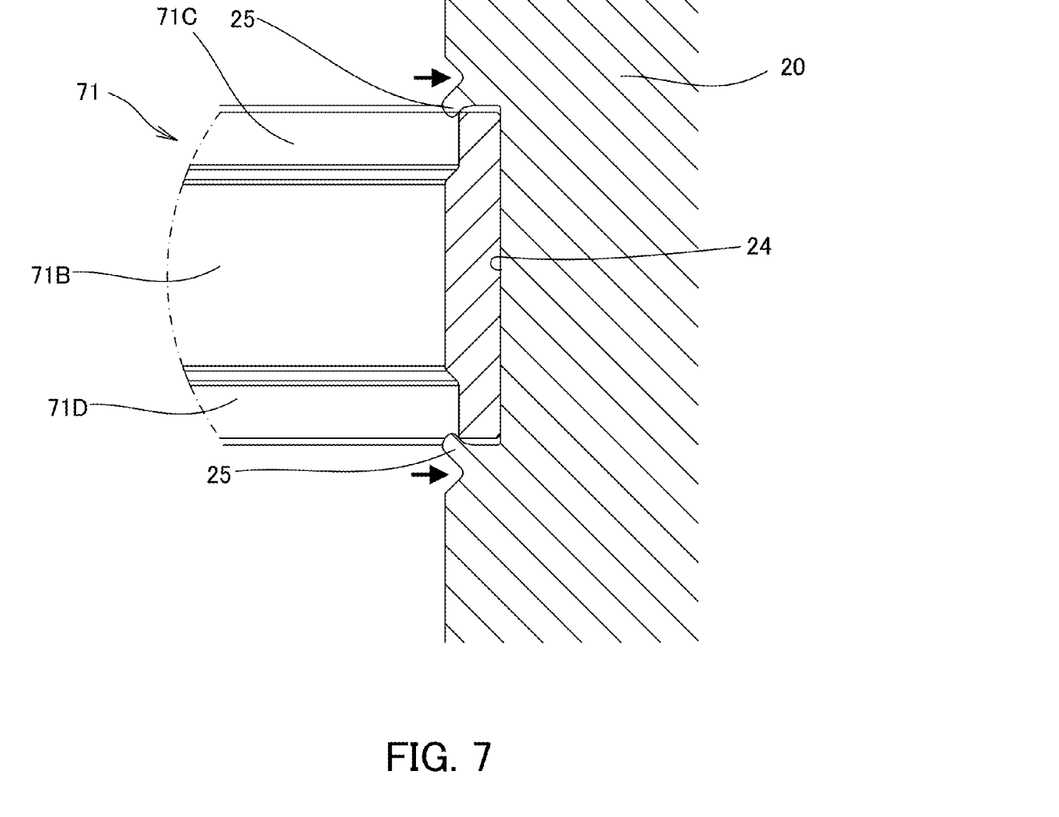
FIG. 7 is a partial longitudinal sectional view of an upper housing according to a modified example of the first embodiment.

In this embodiment, the caulk portions 25 are formed in positions below the annular groove 24 into which the first magnetism collecting ring 71 is fitted, but the formation positions of the caulk portions 25 are not limited thereto. As shown in FIG. 7, for example, caulk portions 25 covering the upper end portion 71C of the first magnetism collecting ring 71 may be formed in addition to the caulk portions 25 covering the lower end portion 71D of the first magnetism collecting ring 71. In this case, the first magnetism collecting ring 71 can be caulked to the upper housing 20 even more securely.

The first magnetism collecting ring 71 may also be caulked to the upper housing 20 using only the caulk portions 25 covering the upper end portion 71C of the first magnetism collecting ring 71.

As shown in FIGS. 5A to 5C, the second magnetism collecting ring 72 is configured identically to the first magnetism collecting ring 71. A radial direction plate thickness of an upper end portion 72C and a lower end portion 72D of the second magnetism collecting ring 72 is set to be thinner than a plate thickness of a central portion 72B. The second magnetism collecting ring 72 is fitted into the annular groove 24 positioned below the first magnetism collecting ring 71, whereupon the second magnetism collecting ring 72, similarly to the first magnetism collecting ring 71, is caulked to the upper housing 20 by the caulk portions 25 formed in the inner peripheral wall of the upper housing 20. The second magnetism collecting ring 72 is caulked identically to the first magnetism collecting ring 71, and therefore description of the manner in which the second magnetism collecting ring 72 is caulked has been omitted.

With the torque sensor 40 according to the first embodiment, described above, following effects are obtained.

By latching the lower portions of the respective inner peripheral surfaces of the first magnetism collecting ring 71 and the second magnetism collecting ring 72 using the caulk portions 25, the first magnetism collecting ring 71 and the second magnetism collecting ring 72 are caulked to the upper housing 20. Therefore the first magnetism collecting ring 71 and the second magnetism collecting ring 72 can be prevented from disengaging from the respective annular grooves 24. As a result, the first magnetism collecting ring 71 and the second magnetism collecting ring 72 are caulked to the upper housing 20 more securely.

Further, in the caulked condition, the first magnetism collecting ring 71 and the second magnetism collecting ring 72 do not project further inward than the inner peripheral wall of the upper housing 20. Therefore, interference between the constituent members of the rotary magnetic circuit portion 60 and the first and second magnetism collecting rings 71, 72 can be prevented when the output shaft 13, to which the rotary magnetic circuit portion 60 is fixed, is inserted into the upper housing 20. As a result, workability during assembly of the torque sensor 40 can be improved.

Figure 8:
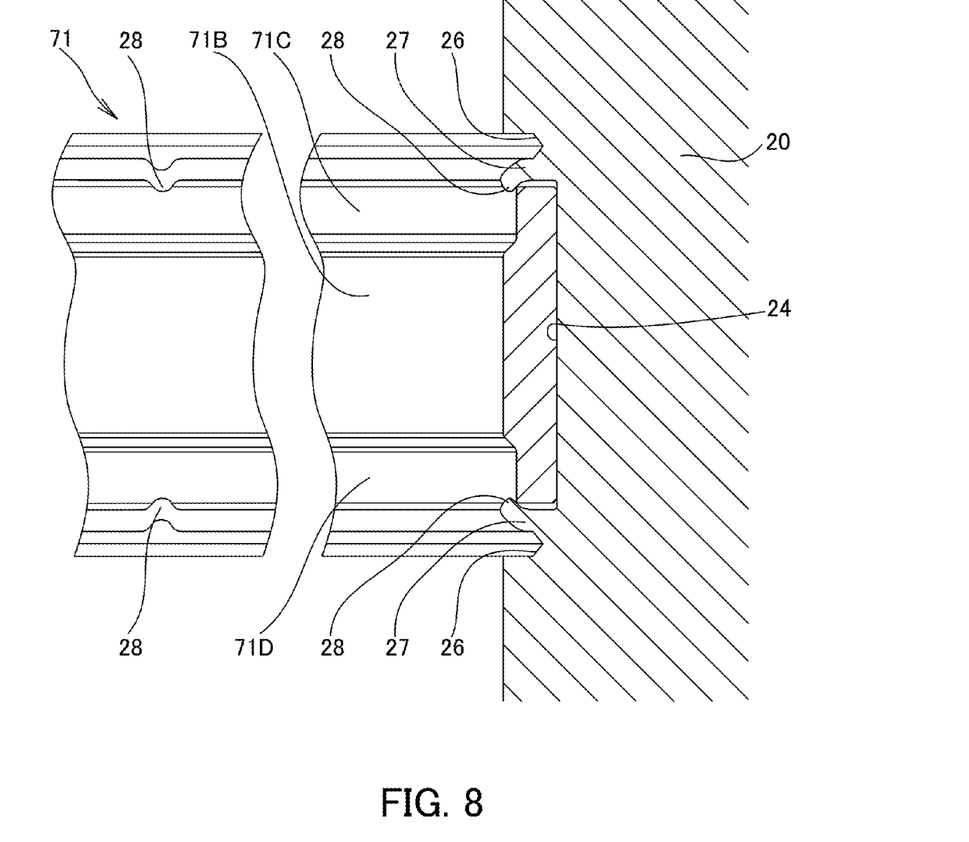
FIG. 8 is a partial longitudinal sectional view showing an upper housing of a torque sensor according to a second embodiment of the present invention.

Referring to FIG. 8, the torque sensor 40 according to a second embodiment of the present invention will be described. FIG. 8 is a partial longitudinal sectional view showing the upper housing 20 of the torque sensor 40 according to the second embodiment. The second embodiment will be described focusing on parts that differ from the first embodiment. It should be noted that in FIG. 8, identical constituent parts to the first embodiment have been allocated identical reference symbols to the first embodiment.

As shown in FIG. 8, upper and lower caulking promotion grooves 26 are formed in series with the annular groove 24 in the axial direction as recesses in the inner peripheral wall of the upper housing 20. By driving a caulking tool into the respective caulking promotion grooves 26, caulk portions 28 that contact the upper end portion 71C and the lower end portion 71D of the first magnetism collecting ring 71 are formed.

The upper and lower caulking promotion grooves 26 are formed in a ring shape in series with the annular groove 24 in the axial direction and at a predetermined distance (between 0.5 and 1.0 mm, for example) therefrom. The caulking promotion grooves 26 are formed as slits having a rectangular longitudinal section.

By forming the caulking promotion grooves 26 and the annular groove 24 in the inner peripheral wall of the upper housing 20, annular caulking wall portions 27 are formed in the upper housing 20 between the annular groove 24 and the respective caulking promotion grooves 26. The caulking wall portions 27 are formed as ribs having a rectangular longitudinal section.

To attach the first magnetism collecting ring 71, the first magnetism collecting ring 71 is fitted into the annular groove 24. Next, respective tip end portions (inner peripheral end portions) of the caulking wall portion 27 are deformed by being bent so as to tilt toward the first magnetism collecting ring 71 by driving a caulking tool into the caulking promotion grooves 26, thereby forming hook-shaped caulk portions 28 respectively covering the upper end portion 71C and the lower end portion 71D of the first magnetism collecting ring 71.

During attachment of the first magnetism collecting ring 71 in the first embodiment, the caulk portions 25 are formed by driving a caulking tool into the inner peripheral wall of the upper housing 20 such that the inner peripheral wall of the upper housing 20 is partially lifted. When the caulk portions 25 are formed in this manner, it is difficult to increase a thickness of sites that are lifted onto the upper end portion 71C and the lower end portion 71D of the first magnetism collecting ring 71.

In the second embodiment, the caulking promotion grooves 26 formed adjacent to the annular groove 24 and the caulking wall portions 27 remaining between the annular groove 24 and the respective caulking promotion grooves 26 are formed in the inner peripheral wall of the upper housing 20. The caulk portions 28 are then formed by pressing a caulking tool against the caulking promotion grooves 26 so as to bend the caulking wall portions 27. When the caulk portions 28 are formed in this manner, the thickness of the sites that are lifted onto the upper end portion 71C and the lower end portion 71D of the first magnetism collecting ring 71 can be increased in comparison with the caulk portions 25 of the first embodiment. As a result, a force by which the caulk portions 28 hold the first magnetism collecting ring 71 and a strength by which the first magnetism collecting ring 71 is fixed to the upper housing 20 can be increased. Furthermore, the caulk portions 28 are formed by deforming the caulking wall portions 27, and therefore irregularities in a shape of the caulk portions 28 can be suppressed, enabling an improvement in quality.

Six caulk portions 28 are formed at predetermined intervals in the circumferential direction, but the number of caulk portions 28 may be set as desired according to necessity. It should be noted that the caulk portions 28 that are lifted onto the upper end portion 71C and the lower end portion 71D of the first magnetism collecting ring 71 may be formed in an annular shape by pressing a roller-shaped caulking tool over an entire periphery of the caulking promotion grooves 26.

Further, the caulking promotion grooves 26 are not limited to being formed in an annular shape, and may be provided as recessed portions formed in a plurality of locations positioned in the vicinity of the caulk portions 28.

Furthermore, the present invention is not limited to a configuration in which the upper and lower caulk portions 28 are respectively formed to cover the upper end portion 71C and the lower end portion 71D of the first magnetism collecting ring 71, and instead, the first magnetism collecting ring 71 may be caulked to the upper housing 20 by forming only one of the upper and lower caulk portions 28.

FIG. 8 illustrates caulking of the first magnetism collecting ring 71, but the second magnetism collecting ring 72 is caulked identically to the first magnetism collecting ring 71, and therefore description of the manner in which the second magnetism collecting ring 72 is caulked has been omitted.

It should be noted that in the first embodiment and the second embodiment, when the upper housing 20 is formed from a resin material, the first magnetism collecting ring 71 and the second magnetism collecting ring 72 are fixed to the upper housing 20 by the caulk portions 25, 28, which are formed by thermal welding-type caulking.

Although the invention has been described above with reference to certain embodiments, the invention is not limited to the embodiments described above. Modifications and variations of the embodiments described above will occur to those skilled in the art, within the scope of the claims.

The present application claims priority based on JP2011-060228, filed with the Japan Patent Office on Mar. 18, 2011, and JP2011-193793, filed with the Japan Patent Office on Sep. 6, 2011, the entire contents of which are incorporated into this specification by reference.

The invention claimed is:

1. A torque sensor that is configured to detect torque acting on a torsion bar coupling a first shaft and a second shaft that are supported in a housing to be free to rotate, the torque sensor comprising:
    a magnetism generating portion fixed to the first shaft;
    a rotary magnetic circuit portion fixed to the second shaft;
    a magnetism collecting ring attached to the housing so as to face the rotary magnetic circuit portion; and
    a magnetism detector that is configured to detect a magnetic flux density that is conducted from the magnetism generating portion to the magnetism collecting ring via the rotary magnetic circuit portion when the torsion bar undergoes torsional deformation,
    wherein the magnetism collecting ring is an annular member and comprises a central portion and an axial direction end portion,
    the axial direction end portion is configured to be thinner than the central portion which is formed as a step portion projecting to an inner side of the magnetism collecting ring, and
    the housing comprises:
    an annular groove formed to be capable of accommodating the magnetism collecting ring and provided as a recess in an inner peripheral wall of the housing so as to be deeper than a thickness of the end portion of the magnetism collecting ring; and a caulk portion provided in the inner peripheral wall to caulk the magnetism collecting ring by covering the end portion of the magnetism collecting ring that is fitted into the annular groove.

2. The torque sensor as defined in claim 1, the torque sensor comprising:

an inner peripheral surface of the central portion of the magnetism collecting ring being flush with the inner peripheral wall of the housing.

3. The torque sensor as defined in claim 1, wherein the caulk portion is provided in a plurality extending around the inner peripheral wall on at least one end portion side of the magnetism collecting ring.

4. The torque sensor as defined in claim 1, the torque sensor further comprising:

a caulking promotion groove formed adjacent to the annular groove in the axial direction and a caulking wall portion remaining between the caulking promotion groove and the annular groove are formed in the inner peripheral wall of the housing, wherein the caulk portion is formed by deforming the caulking wall portion.

* * * * *